US007022968B1

(12) United States Patent
Hopper et al.

(10) Patent No.: US 7,022,968 B1

(45) Date of Patent: Apr. 4, 2006

(54) OPTICAL SENSOR THAT MEASURES THE LIGHT OUTPUT BY THE COMBUSTION CHAMBER OF AN INTERNAL COMBUSTION ENGINE

(75) Inventors: Peter J. Hopper, San Jose, CA (US); Philipp Lindorfer, San Jose, CA (US); Michael Mian, Livermore, CA (US); Robert Drury, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 147 days.

(21) Appl. No.: 10/690,181

(22) Filed: Oct. 21, 2003

(51) Int. Cl.
*H01J 40/14* (2006.01)

(52) U.S. Cl. ................. 250/215; 313/118; 123/406.28; 123/435

(58) Field of Classification Search ................ 250/215; 123/406.22, 406.28, 406.29, 435; 73/116, 73/117.2, 117.3, 118.1, 119 R; 313/118, 313/140, 142–143; 374/102
See application file for complete search history.

(56) References Cited

U.S. PATENT DOCUMENTS

| | | | | |
|---|---|---|---|---|
| 4,393,687 | A * | 7/1983 | Muller et al. | 73/35.07 |
| 4,422,321 | A * | 12/1983 | Muller et al. | 73/35.01 |
| 4,489,596 | A * | 12/1984 | Linder et al. | 73/116 |
| 4,919,099 | A * | 4/1990 | Extance et al. | 123/406.28 |
| 5,932,873 | A | 8/1999 | Bergemont et al. | 250/208.1 |
| 5,962,844 | A | 10/1999 | Merrill et al. | 250/214 A |
| 5,965,875 | A | 10/1999 | Merrill | 250/226 |
| 5,970,316 | A | 10/1999 | Merrill | 438/57 |
| 5,982,012 | A | 11/1999 | Merrill | 257/463 |
| 6,002,432 | A | 12/1999 | Merrill et al. | 348/241 |
| 6,018,365 | A | 1/2000 | Merrill | 348/302 |
| 6,066,510 | A | 5/2000 | Merrill | 438/57 |
| 6,088,058 | A | 7/2000 | Mead et al. | 348/296 |
| 6,150,683 | A | 11/2000 | Merrill et al. | 257/292 |
| 6,160,282 | A | 12/2000 | Merrill | 257/292 |
| 6,204,594 | B1 * | 3/2001 | Ingham | 313/141 |
| 6,211,510 | B1 | 4/2001 | Merrill et al. | 250/208.1 |
| 6,246,043 | B1 | 6/2001 | Merrill | 250/208.1 |
| 6,359,377 | B1 * | 3/2002 | Durling | 313/141 |
| 6,369,853 | B1 | 4/2002 | Merrill et al. | 348/302 |
| 6,410,899 | B1 | 6/2002 | Merrill et al. | 250/208.1 |
| 6,452,633 | B1 | 9/2002 | Merrill et al. | 348/302 |
| 6,476,372 | B1 | 11/2002 | Merrill et al. | 250/208.1 |
| 6,512,544 | B1 | 1/2003 | Merrill et al. | 348/302 |
| 6,525,304 | B1 | 2/2003 | Merrill et al. | 250/208.1 |
| 6,606,120 | B1 | 8/2003 | Merrill et al. | 348/273 |
| 6,632,701 | B1 | 10/2003 | Merrill | 438/70 |
| 6,636,261 | B1 | 10/2003 | Pritchard et al. | 348/308 |
| 6,697,114 | B1 | 2/2004 | Merrill | 348/308 |
| RE38,499 | E | 4/2004 | Merrill et al. | 348/301 |
| 6,727,521 | B1 | 4/2004 | Merrill | 257/98 |
| 6,731,397 | B1 | 5/2004 | Merrill et al. | 358/1.16 |
| 6,741,283 | B1 | 5/2004 | Merrill et al. | 348/308 |
| 6,750,489 | B1 | 6/2004 | Merrill | 257/292 |
| 6,760,070 | B1 | 7/2004 | Merrill et al. | 348/294 |

* cited by examiner

*Primary Examiner*—David Porta
*Assistant Examiner*—Suezu Ellis
(74) *Attorney, Agent, or Firm*—Mark C. Pickering

(57) ABSTRACT

An optical sensor provides information about the burn of the fuel mixture in the combustion chamber of an internal combustion engine as well as the timing and waveform of the spark that ignites the fuel mixture in the combustion chamber. The optical sensor can be implemented as a stand-alone device, or incorporated into a spark plug.

20 Claims, 2 Drawing Sheets

OPTICAL SENSOR THAT MEASURES THE LIGHT OUTPUT BY THE COMBUSTION CHAMBER OF AN INTERNAL COMBUSTION ENGINE

BACKGROUND OF THE INVENTION

1. Field of the Invention

The present invention relates to optical sensors and, more particularly, to an optical sensor that measures the light output by the combustion chamber of an internal combustion engine.

2. Description of the Related Art

A spark plug is a well-known part of an internal combustion engine that, when installed, is located in a combustion chamber near the top of a cylinder of the engine. Following the intake and compression cycles of a piston within the cylinder, the spark plug generates a spark across a gap which burns the compressed fuel in the cylinder.

FIG. 1 shows a cross-sectional view that illustrates a prior-art spark plug 100. As shown in FIG. 1, spark plug 100 includes a conductive center electrode 110, a ceramic jacket 112 that fits around center electrode 110, and an outer metal shell 114 that fits around ceramic jacket 112.

Conductive center electrode 110 has a first end 120 and a spaced apart second end 122. In addition, outer metal shell 114 is threaded for insertion into an engine block, and includes a tip 126 that curves up and around to be directly over first end 120 of electrode 110 such that an end 128 of tip 126 is spaced apart from end 120 of electrode 110 by a gap 130.

In operation, center electrode 110, which is connected via end 122 to a rotor or switching device which, in turn, is connected to a coil, periodically receives a voltage spike from the coil via the rotor or switching device. The voltage spike ionizes the air in gap 130 between electrode 110 and tip 126 such that a current flows from electrode 110 to tip 126 (to ground via the engine block) creating a spark.

FIG. 2 shows a time versus voltage graph that illustrates a waveform of an input voltage 200 that is received by a prior art spark plug. As shown in FIG. 2, point A represents the point when current flow in the primary winding of the coil is interrupted. The interruption in current flow in the primary winding induces a current in the secondary winding of the coil which causes voltage 200 to instantaneously spike from point A to point B, and then fall back to point C.

The magnitude of voltage 200 at point B is sufficient to ionize the air and create a current flow (an arch) from electrode 110 to tip 126, while the magnitude of voltage 200 at point C is sufficient to maintain the current flow once it has begun. Following the instantaneous spike, the magnitude of voltage 200 remain substantially constant from point C to point D, where the current flow stops.

The current flow stops when the energy in the second winding of the coil can no longer sustain the current flow. As further shown in FIG. 2, from point D to point E, once the current flow stops, the magnitude of voltage 200 drops and oscillates around ground, eventually settling to ground.

The timing of voltage 200 with respect to the position of the piston head in the cylinder as the piston head nears the completion of the compression cycle impacts the performance of the engine. When the spark plug generates a spark, the completeness of the burn of the fuel mixture depends on the position of the piston head at the time of the spark.

For example, the fuel is burned to a first level when the spark plug generates a spark just before the piston head reaches the end of its stroke, while the fuel is burned to a second level when the spark plug generates a spark as the piston head reaches the end of its stroke. In current generation ignition systems, the timing of the spark (voltage 200) is controlled by an electronic ignition system.

DETAILED DESCRIPTION OF THE INVENTION

Figure 1:
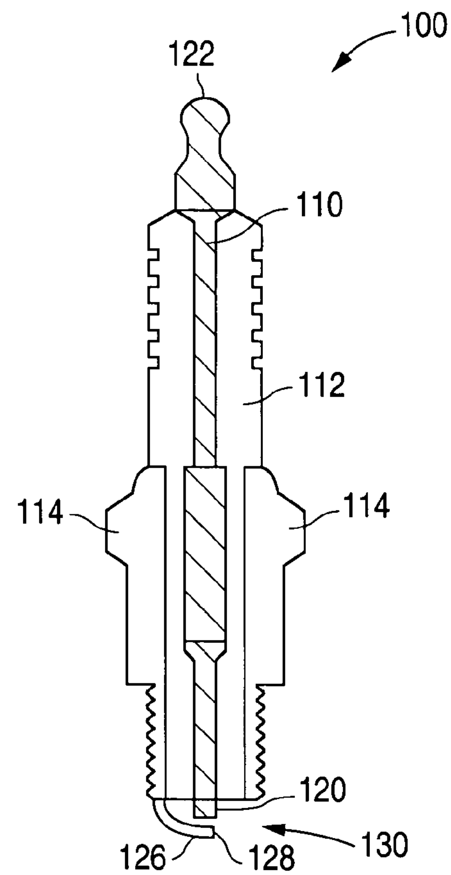
FIG. 1 is a cross-sectional view illustrating a prior-art spark plug 100.
Figure 2:
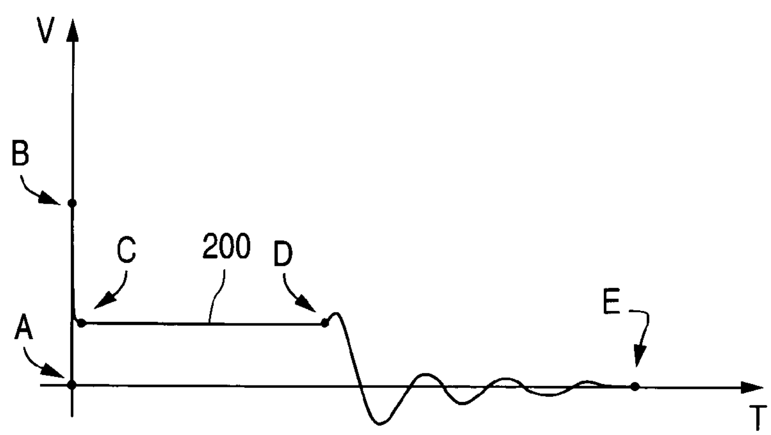
FIG. 2 is a time versus voltage graph illustrating a waveform of an input voltage 200 received by a prior art spark plug.
Figure 3:
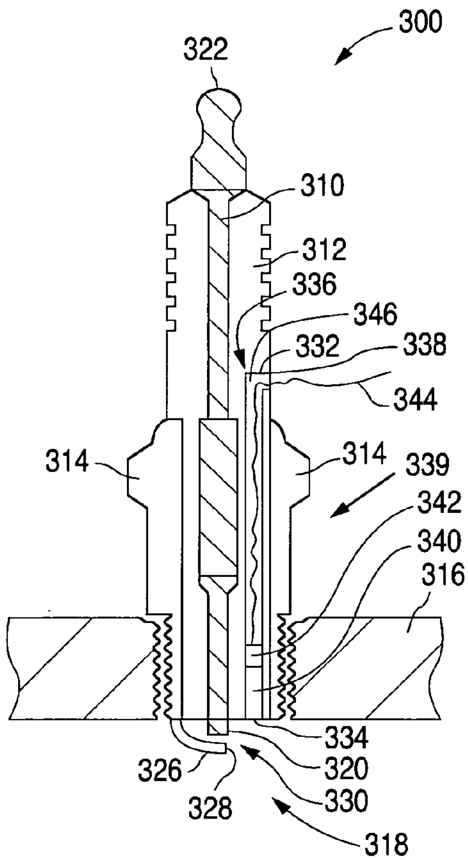
FIG. 3 is a cross-sectional view illustrating an example of a spark plug 300 in accordance with the present invention.

FIG. 3 shows a cross-sectional view that illustrates an example of a spark plug 300 in accordance with the present invention. As shown in FIG. 3, spark plug 300 includes a conductive center electrode 310, a ceramic jacket 312 that fits around center electrode 310, and an outer metal shell 314 that fits around ceramic jacket 312. Spark plug 300 can be screwed into an engine side wall 316 to extend into a combustion chamber 318 of an engine cylinder.

Conductive center electrode 310 has a first end 320 and a spaced apart second end 322. In addition, outer metal shell 314 is threaded for insertion into side wall 316, and includes a tip 326 that curves up and around to be directly over first end 320 of electrode 310 such that an end 328 of tip 316 is spaced apart from end 320 of electrode 310 by a gap 330.

Conductive center electrode 310 and outer metal shell 314 can be implemented with conventional electrodes and shells, respectively, such as conductive center electrode 110 and outer metal shell 114. In accordance with the present invention, ceramic jacket 312 is conventionally formed except that ceramic jacket 312 also includes a hole 332.

In the example shown in FIG. 3, hole 332 is an L-shaped hole, although other shaped holes can alternately be used. L-shaped hole 332 begins at an opening 334 that lies adjacent to first end 320, and runs along a first line that is substantially parallel to the longitudinal axis of ceramic jacket 312 to a point 336 that lies on the outside of engine wall 316. From point 336, hole 332 runs perpendicularly away from the longitudinal axis to an opening 338 on the side of ceramic jacket 312.

In further accordance with the present invention, spark plug 300 also includes an imaging structure 339 that includes an imager 340, and a wiring substrate 342 that is connected to imager 340. In addition, imaging structure 339 includes a number of wires 344 that are connected to wiring substrate 342, and a rigid structure 346 that is connected to wiring substrate 342.

Imager 340, wiring substrate 342, and rigid structure 346 are formed in the section of hole 332 that lies parallel to the longitudinal axis, while wires 344 extend from wiring substrate 342 through hole 332 and out opening 338. In addition, imager 340 can be housed in a transparent ceramic material, such as glass or sapphire, to minimize temperature effects.

Further, imager 340 can be implemented with one or more black and white cells that each has a single photodiode, or one or more color cells. The color cells can be implemented, for example, as vertical color cells as described in U.S. patent application Ser. No. 10/219,836 to Peter J. Hopper et al. filed on Aug. 15, 2002, or U.S. patent application Publication No. 2002/0058353 A1 to Richard Merrill published on May 16, 2002, which are both hereby incorporated by reference. A black and white cell provides intensity information, while a color cell provides both intensity and color information.

The metal interconnect layers of imager 340 can be externally connected using through-the-wafer metal connectors such as described in U.S. patent application Ser. No. 10/004,977 to Visvamohan Yegnashankaran et al. filed on Dec. 3, 2001 or U.S. Pat. No. 6,252,300 B1 to Hsuan et al. issued on Jun. 26, 2001 which are both hereby incorporated by reference. The through-the-wafer metal connectors, in turn, can be electrically connected to wiring substrate 342 using a connecting material such as, for example, solder balls.

In addition, imager 340 can be physically connected to wiring substrate 342 using an adhesive. The adhesive has a compressibility that desirably passes pressure waves, which result from the combustion of the fuel, from imager 340 to wiring substrate 342. Further, the adhesive has a maximum temperature that exceeds the local maximum temperature that results from burning fuel in combustion chamber 318 of the engine.

Rigid structure 346 can be implemented with any rigid structure that accommodates the passage of wires 344, and remains in place when pressure waves from explosions in the combustion chamber hit structure 346. For example, structure 346 can be rigid when inserted into hole 332, or can be formed from material that is injected into hole 332 and then subsequently cured. If rigid when inserted, then rigid structure 346 is connected to ceramic jacket 312 at point 336 and wiring substrate 342 with an adhesive. The adhesive can be the same as or different from the adhesive between vertical color imager 340 and wiring substrate 342.

In addition, the length of rigid structure 346 is defined such that when structure 346 is inserted into hole 332 and one end of structure 346 contacts ceramic jacket 312 at point 336, and the other end of structure 346 contacts wiring substrate 342, imager 340 is located at or near opening 334.

In one embodiment, imager 340 is directly exposed to combustion chamber 318 of the engine. In an alternate embodiment, imager 340 is located near opening 334, and a transparent protective material, such as a glass or sapphire plug, is formed in hole 332 between imager 340 and combustion chamber 318 of the engine. The protective material reduces the temperature and pressure effects from combustion chamber 318.

In operation, imager 340 measures the intensity of the spark across gap 330 and the fuel burn over time when imager 340 includes a black and while cell, and both the intensity and color when imager 340 is a color cell. The measured intensity or intensity/color data are transmitted to an ignition control unit which evaluates the intensity or intensity/color information to generate control information.

For example, the intensity or intensity/color information can be used to access a look up table or as inputs to a mathematical basis function to generate control information that advances or retards the timing of the spike in the input voltage that causes the spark, or changes the shape of the input voltage.

In addition, the control information can also be used to change, alone or in any combination, the fuel mixture, fuel injection timing, fuel inlet value timing, and exhaust outlet value timing in response to the intensity or intensity/color information. Further, the timing of the valves can be dynamically changed per combustion chamber.

Thus, the present invention provides a method of optimizing the combustion in an internal combustion engine. The method includes the step of detecting a light that has been emitted inside the combustion chamber of the engine, and the step of altering the operation of the internal combustion engine in response to the intensity or intensity/color of the light.

In the method, the light can include burned light that results from burning a substance in the combustion chamber of the engine. The substance can have a number of components, such as fuel and air, that each has a relative concentration. In addition, the altering step can alter the relative concentrations of the components in response to the burned light. For example, the relative concentrations of a fuel-air mixture can be altered in response to the optical response of the burned substance.

The method can also include spark light that results from a spark extending across the gap. Further, the altering step can alter a timing of the spark across the gap in response to the spark light. The altering step can also alter a waveform of the spark in response to the light detected from the spark. In addition, the altering step can also include altering a timing of the fuel inlet and exhaust outlet values.

One of the advantages of the present invention is that the present invention provides a feedback mechanism that establishes a control loop that allows the ignition profile, fuel management, and valve timing to be optimized to a provide a predetermined performance, such as reduced fuel consumption or increased power.

Another advantage of the present invention is that although the present invention allows the operating conditions to be optimized, the present invention is not required to maintain engine operation. As a result, the present invention is fail safe in that failure of the invention will not cause failure of the system.

Figure 4:
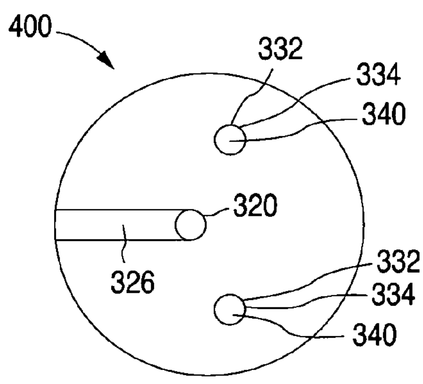
FIG. 4 shows an end view illustrating an example of a spark plug 400 in accordance with an alternate embodiment of the present invention.

FIG. 4 shows an end view illustrating an example of a spark plug 400 in accordance with an alternate embodiment of the present invention. Spark plug 400 is similar to spark plug 300 and, as a result, utilizes the same reference numerals to designate the structures which are common to both spark plugs.

As shown in FIG. 4, spark plug 400 differs from spark plug 300 in that spark plug 400 has a ceramic jacket with two holes 332, and two imagers 340 that are formed in the two holes 332, respectively. In addition, spark plug 400 has two wiring substrates, two groups of wires, and two rigid structures that are formed in the two holes 332, respectively. (Additional numbers of holes, imagers, substrates, wires, and rigid structures can also be used.) By utilizing multiple imagers (two or more cells), spatial information can also be obtained regarding the spark and burn.

It should be understood that the above descriptions are examples of the present invention, and that various alternatives of the invention described herein may be employed in practicing the invention. For example, although the present invention has been described in terms of a spark plug with an optical sensor, a stand-alone sensor can also be used.

Figure 5:
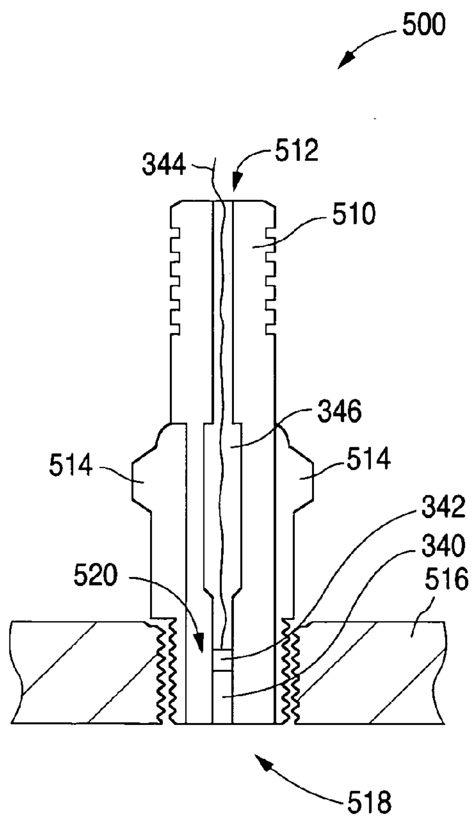
FIG. 5 is a cross-sectional view illustrating an example of a stand-alone sensor 500 in accordance with the present invention.

FIG. 5 shows a cross-sectional view that illustrates an example of a stand-alone sensor 500 in accordance with the present invention. As shown in FIG. 5, sensor 500 includes a ceramic jacket 510 that has a hole 512 that extends through jacket 510, and an outer metal shell 514 that fits around ceramic jacket 510.

In the example shown in FIG. 5, hole 512 is a straight hole, which has an end portion and a middle portion that is wider than the end portion, that runs along a line that is substantially coincident with the longitudinal axis of ceramic jacket 510, although other shaped holes in other locations can alternately be used. In addition, outer metal shell 514 has a threaded portion that can be screwed into an engine side wall 516, which has been tapped to accept sensor 500, to be exposed to a combustion chamber 518 of an engine cylinder.

As further shown in FIG. 5, sensor 500 includes a center imaging structure 520 that is formed in hole 512. Further, imaging structure 520 can be implemented with imaging structure 339. Although imaging structure 520 is shown in FIG. 5 as being directly exposed to combustion chamber 518 at one end of hole 512, sensor 500 can also include a transparent ceramic material that lies between combustion chamber 518 and imaging structure 520, which is spaced apart from the end of hole 512 to accommodate the transparent ceramic material.

Further, sensor 500 can also include a ceramic jacket with multiple holes, and multiple imaging structures that are formed in the respective holes in a manner similar to spark plug 400. Thus, it is intended that the following claims define the scope of the invention and that structures and methods within the scope of these claims and their equivalents be covered thereby.

What is claimed is:

1. A sensor comprising:

an insulating jacket having a hole that extends through the insulating jacket;

an imaging structure located completely in the hole, the imaging structure converting photons into an electrical signal; and an outer metal shell that fits around and contacts the insulating jacket.

2. The sensor of claim 1 and further comprising a conductor located in the hole, the conductor being connected to the imaging structure, and extending out of the hole.

3. The sensor of claim 2 wherein the imaging structure includes a color imaging cell.

4. The sensor of claim 3 wherein the color imaging cell includes a vertical color imaging cell.

5. The sensor of claim 2 wherein the imaging structure includes a black and white imaging cell.

6. The sensor of claim 2 wherein the conductor carries the electrical signal.

7. The sensor of claim 1 wherein the insulating jacket further includes a channel that longitudinally extends through the insulating jacket.

8. The sensor of claim 7 and further comprising a conductive electrode having a first end and a spaced apart second end located in the channel, and wherein the outer metal shell has a tip that curves up and around to be directly over the first end of the conductive electrode such that an end of the tip is spaced apart from the first end of the conductive electrode by a gap.

9. The sensor of claim 8 wherein the hole has an L-shape and an opening that lies adjacent to the first end of the conductive electrode.

10. The sensor of claim 8 wherein the hole has a first opening and a spaced apart second opening that lie on opposite sides of an engine wall.

11. The sensor of claim 1 wherein the hole has an L-shape.

12. The sensor of claim 1 wherein the hole is substantially straight, and has an end region and a middle region that is wider than the end region.

13. A sensor comprising:

an insulating jacket having a hole that longitudinally extends through a portion of the insulating jacket;

an imaging structure located in the hole, the imaging structure including:

an imager that collects photon information;

a wiring substrate connected to the imager;

a plurality of wires connected to the wiring substrate that carry photon information and extend out of the hole; and a rigid structure that contacts the wiring substrate; and an outer metal shell that fits around and contacts the insulating jacket.

14. The sensor of claim 13 wherein the imager includes a color imaging cell.

15. The sensor of claim 14 wherein the color imaging cell includes a vertical color imaging cell.

16. The sensor of claim 13 wherein the imager includes a black and white imaging cell.

17. The sensor of claim 13 wherein the insulating jacket further includes a channel that longitudinally extends through the insulating jacket.

18. The sensor of claim 17 and further comprising a conductive electrode having a first end and a spaced apart second end located in the channel, and wherein the outer metal shell has a tip that curves up and around to be directly over the first end of the conductive electrode such that an end of the tip is spaced apart from the first end of the conductive electrode by a gap.

19. The sensor of claim 13 wherein the hole has an L-shape.

20. The sensor of claim 13 wherein the hole is substantially straight, and has an end region and a middle region that is wider than the end region.

* * * * *